United States Patent [19]
Fein et al.

[11] Patent Number: 5,029,691
[45] Date of Patent: Jul. 9, 1991

[54] CHAIN CONVEYOR AND PALLET

[76] Inventors: Ronald K. E. Fein, 44596 Penney Ct., Canton, Mich. 48187; Kurt W. Schwammle, 4958 Whispering Pine La., Bloomfield Hills, Mich. 48013

[21] Appl. No.: 408,132
[22] Filed: Sep. 15, 1989
[51] Int. Cl.⁵ .............................................. B65G 37/00
[52] U.S. Cl. ................................. 198/346.1; 198/465.3
[58] Field of Search ................ 198/465.3, 346.1, 803.2

[56] References Cited

U.S. PATENT DOCUMENTS

| | | | |
|---|---|---|---|
| 4,062,444 | 12/1977 | Nakov et al. | 198/803.2 |
| 4,681,212 | 7/1987 | Miller | 198/465.3 |
| 4,850,472 | 2/1989 | Liebel et al. | 198/465.3 |

FOREIGN PATENT DOCUMENTS 3539303 5/1987 Fed. Rep. of Germany ... 198/465.3
1407765 7/1988 U.S.S.R. .......................... 198/465.3

Primary Examiner—Joseph E. Valenza
Attorney, Agent, or Firm—Dykema Gossett

[57] ABSTRACT

An improved chain conveyor and pallet structure are disclosed in which the pallet contacts the second, or middle link of the three-link chains typically employed in chain conveyors. The pallet contacts the middle link, and is supported upon the outer and inner links of the chain. In addition, the distance between the pallet contact members and the support surfaces is increased such that the pallet may be removed from the chain conveyor for repair or placement on a second conveyor. With the improved pallet structure, up to four times as much weight may be supported than in prior art pallets which were typically supported on the innermost link of the three-link endless chains.

19 Claims, 2 Drawing Sheets

CHAIN CONVEYOR AND PALLET

BACKGROUND OF THE INVENTION

This invention in general relates to an improved conveyor and pallet structure in which the pallet supports greater weights than in the prior art. In addition, the improved conveyor allows the pallet to be easily removed from the conveyor for placement on a second conveyor, or repair of the pallet.

A known type of conveyor employs chains to frictionally engage and move a part carrying pallet through a conveyor distance. Modern chain conveyors typically include two shafts rotating about parallel axes that are spaced from each other by a conveyor distance over which pallets are to be conveyed. In a common type of chain conveyor, each of these shafts have two sprocket sets, each having two separate sprocket gears spaced axially along the shaft. Endless three-link chains are mounted upon one sprocket set on each of the shafts and extend along the conveyor throughout the conveyor distance. The endless chains are thus also spaced by an axial distance corresponding to the distance between the sprocket sets. Pallets are mounted in contact with the endless chains and are driven along the conveyor distance by frictional contact with the three-link chains. The pallets will typically travel along the upper extent of the chain, commonly known as an upper run, reach the end of the conveyor distance, are pivoted beneath the sprocket sets, and travel on the endless chain below the sprockets, commonly known as the lower run.

In many prior art chain conveyors, the chains may be supported upon the chain links closest to the axial ends of the conveyor, and the third chain link, which is the axially innermost chain link, supports the pallet. Since the three-link chain in the conveyors must bear the weight of the pallet from an innermost ;link, and is cantilever supported at an outer link, a moment arm is created about the outermost link of the chain that may result in the chain binding or bending if an overly great weight is placed upon the pallet.

In the past, the chains were often covered at vertically upper positions by supports, which prevented access to the chains. Also, any debris or chips could become lodged between the supports and the chain.

In addition, the prior art pallet had frictional contact members that contact the chain during the upper and lower runs, such that there was insufficient clearance between the contact members and the chain to allow the pallet to be easily removed from the chain conveyor system. In many of the prior art chain conveyors, the pallet needed to be disassembled in order to be removed from the endless chains.

SUMMARY OF THE INVENTION

The present invention solves the problems of the prior art by supporting the pallet at a point on a means for moving the pallet, and supporting the means for moving the pallet on both axial sides of the point. In one embodiment an improved chain conveyor and pallet structure is disclosed in which the pallet is supported at a position on the three-link chain intermediate two support positions through which the three-link chain is supported on a frame of the chain conveyor. In addition, clearance is provided between the frictional contact members of the pallet and a support surface for the three-link chains such that the pallet may be removed from the chain conveyor without disassembly of the pallet. This facilitates robotic removal of a pallet from a chain pallet such that the pallet can be removed from a first conveyor after completion of a first conveyor upper run and placed on a second conveyor extending in a different direction.

The chain conveyor as disclosed by an embodiment of the present invention comprises a first shaft that rotates about a first axis and has at least two sprocket sets spaced axially along the first axis. A second shaft rotates about a second axis that is parallel to the first axis and spaced from the first axis by a conveyor distance over which parts are to be conveyed. The second shaft also has at least two sprocket sets spaced axially along the second axis. Frame members mount and define axial ends of the first and second shafts.

A pair of endless three-link chains are received over one of the sprocket sets on the first axis and one of the sprocket sets on the second axis such that the endless chains extend over one of the sprocket sets on the first axis, extend on an upper run along the conveyor distance, extend over and under one of the sprockets sets on the second axis, and extend back along a lower run beneath the sprocket sets to the sprocket set on the first axis. Each of the endless chains have three links with the links being spaced inwardly from each of the axial ends towards the other of the axial ends. A first link is defined as the link closest to the axial end, a second link is defined as the next innermost link and a third link is defined as the axially innermost link.

A pallet is mounted for movement on the endless chains with the pallet having a generally planer support surface and a pair of downwardly extending guide bars, each of the guide bars may have an upper run contact member in contact with the second link of one of the endless chains. The upper run contact member on the two guide bars are spaced from each other by a distance equal to the distance between the second links of the pair of endless chains. This arrangement will support approximately four times as much weight on the pallet then many prior art conveyors.

In a preferred embodiment of the present invention, each of the guide bars have a lower run contact member in contact with the third link when the pallet is on a lower run.

A pair of upper run frames support the pair of endless three-link chains along the upper run and have support surfaces below each of the first and third links. The guide bar has an axially outermost extent between the upper and lower guide members that provides a first clearance between the guide bar, the three-link chain and the upper run frames. The lower run contact member of the guide bar is spaced downwardly from the upper run frame by a second clearance. The combined clearances allow the pallet to be lifted and pivoted approximately 90 degrees and removed from the chain conveyor.

These clearance distances allow the removal of the pallets by a robotic manipulator, or automatic station, such that a single pallet could be used to convey parts along a first chain conveyor, removed by the robotic manipulator, turned and placed on a second conveyor extending in a second direction. The second conveyor could extend directly opposite to the first conveyor distance, and at the end of the second conveyor, a second robotic manipulator could remove the pallet from the second conveyor and replace it on the first conveyor.

Also, the pallet can be lifted, turned 180 degrees and replaced on the conveyor by an automatic station. This allows reorientation of the parts on the pallet as they proceed along the conveyor.

The pallets are thus removed by being lifted, shifted, pivoted and removed. The pallets are also easily removable for replacement or repair.

A pair of lower run frames support the endless three-link chains at the lower run below the second link. In one embodiment, the lower run contact member contacts the chain on the third link. Since the pallet will be unloaded on the lower run, the problems associated with contacting the third link are not experienced on the lower run. It is possible that the lower run contact member contact the endless chain on the second link, however that would require that the sprocket sets have only a single sprocket gear axially outwardly of the second link.

In a most preferred embodiment of the present invention, the upper and lower run contact member extend for a greater distance or length along the conveyor distance than the pallet support surface. This provides more secure contact between the pallet and the endless chains as they move along the conveyor distance. In addition, the upper run contact portion may be longer than the lower run contact portion, providing proper guidance as the pallet turns about the sprocket sets at the end of the conveyor distance.

These and other objects and features of the present invention can be best understood from the following specification and drawings, which the following is a brief description thereof.

DETAILED DESCRIPTION OF A PREFERRED EMBODIMENT

Figure 1:
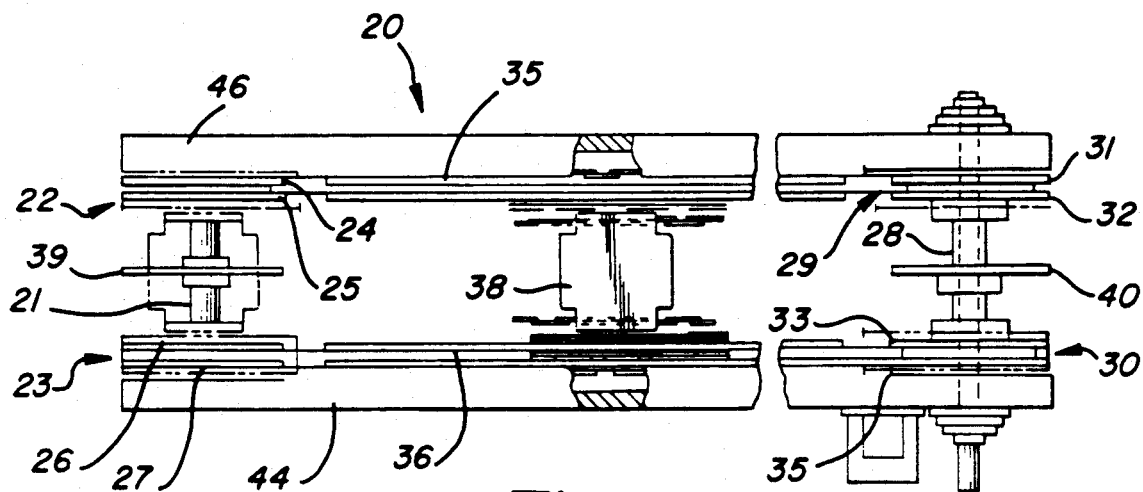
FIG. 1 is a top view of a chain conveyor as known in the prior art.
Figure 2:
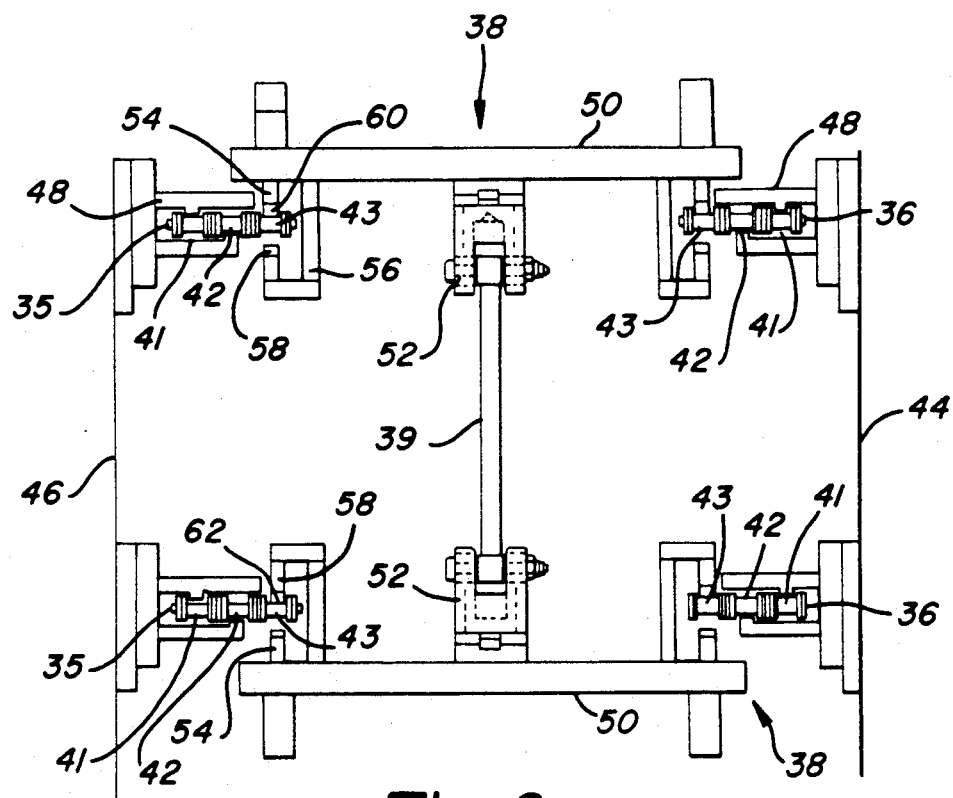
FIG. 2 is a cross-section view through the prior art chain conveyor shown in FIG. 1 and showing separate pallets mounted on both the upper and lower runs.

The prior art chain conveyor structure can be best understood from FIGS. 1 and 2. As shown in FIG. 1, chain conveyor 20 consists of a first shaft 21 rotating about a first axis and having a pair of axially-spaced sprocket sets 22 and 23. Sprocket set 22 has a pair of sprocket gears 24 and 25 spaced by a small axial distance and sprocket set 23 has a pair of sprocket gears 26 and 27, also spaced by a small axial distance. A second shaft 28 rotates about a second axis and has sprockets sets 29 and 30 spaced by an axial distance. Sprocket set 29 has a pair of sprocket gears 31 and 32 spaced by a small axial distance and sprocket set 30 has a pair of sprocket gears 33 and 34 also spaced by a small axial distance. Means for moving a pallet comprise an endless three-link chain 35 mounted upon sprocket sets 22 and 29 and extending between the first and second axis. A second endless three-link chain 36 is mounted upon sprocket set 23 and 30 and extends over the distance between the two sprocket sets. It is to be understood that the chains rotate on the sprocket sets and extend above the sprockets over the distance between the sprockets, also known as an upper run, to carry parts on pallet 38. At the end of the upper run, pallet 38 rotates over the sprocket sets and beneath the sprocket sets along with the endless three-link chains 35 and 36. Pallet 38 will then extend along with the chains 35 and 36 below the sprocket sets along a lower run and return to the sprocket sets at the other end of the lower run. The distance between shafts 21 and 28 is defined as a conveyor distance. Center sprocket 39 is mounted on first shaft 21 and center sprocket 40 is mounted on second shaft 28 in order to assist in guiding pallet 38 as it moves from the upper run to the lower run by rotating around the sprocket sets.

As shown in FIG. 2, each endless three-link chain 35 and 36 has a first link 41 which is nearest to the axial end of the endless three-link chains 35 and 36, a second link 42 that is the next innermost link, and a third link 43 which is the axially innermost link, that is, the link closest to the opposite endless three-link chain 35 or 36. Frame members 44 and 46 are disposed upon each axial end of chain conveyor 20 and mount shafts 21 and 28 for rotation, First link 41 is the link closest to either of frames 44 or 46, second link 42 is the next innermost link, and third link 43 is the link furthest removed from frame members 44 or 46 and closest to the opposed one of frame members 44 or 46.

In the prior art, chain support 48 mounted chains 35 and 36 along both the upper and lower runs, In some prior art chain conveyors, chain support 48 provided support beneath second link 42 of endless three-link chain 35 or 36 and above first link 41 of endless three-link chain 35 or 36.

Pallet 38, as used with some prior art chain conveyors consisted of support surface 50 upon which parts to be conveyed were placed and which had a spring-loaded center sprocket engagement member 52 that would be biased into engagement with center sprockets 39 or 40 when pallet 38 reached the end of either an upper or lower run.

Pallet 38 may have an upper run contact member 54 in contact with third-link 43 of endless three-link chains 35 and 36 at contact point 60. Thus, pallet 38 was supported on the axially innermost third link 43 of endless three-link chains 35 and 36 while on an upper run. Endless three-link chains 35 and 36 were often supported on their second link 42 and first link 41. Thus, the weight from pallet 38 was supported from third link 43 and transmitted into first and second link 41 and 42 and from there into chain support 48. This resulted in a moment arm about the cantilever-type support that would sometimes cause binding between chain 35 and 36 and support 48. This limited the maximum weight that could be conveyed along pallet 38, since support 48 could only cantilever support a limited amount of weight. Pallet 38 also had a downwardly extending lower run contact arm 56 that extended to contact member 58.

Lower run contact member 58 would be in contact with third link 43 of endless three-link chains 35 and 36 at contact point 62 when pallet 38 was extending along a lower run. The distance between upper run contact member 54, lower run contact arm 56, contact member 58, supports 48 and three-link chains 35 and 36 determines the clearance between endless three-link chains 35 and 36 and pallet 38. In many prior art chain conveyors, this clearance was not adequate to allow the pallet 38 to be removed from the chain conveyor without disassembly of one of contact members 54 or 58.

Figure 3:
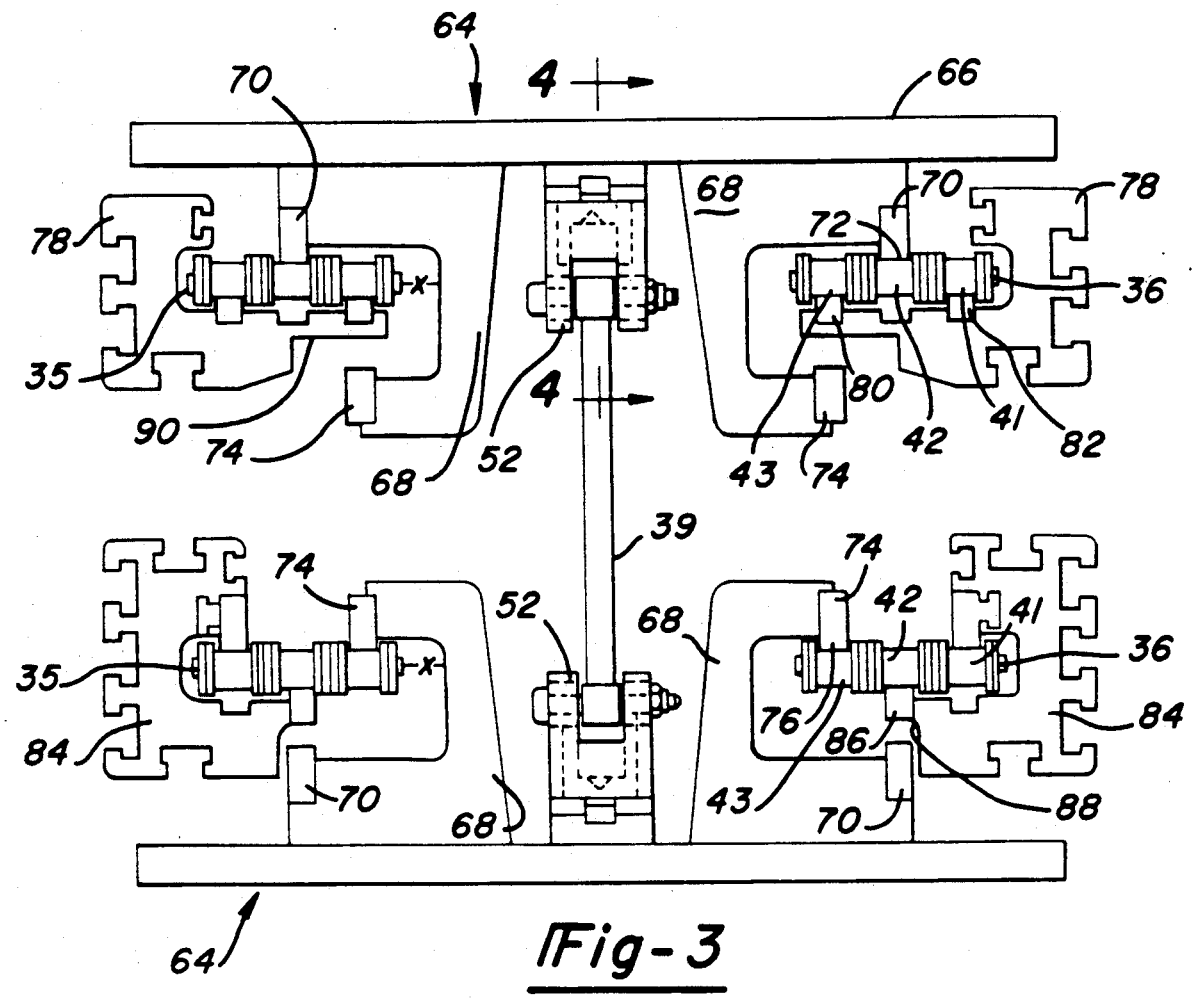
FIG. 3 is a cross-section view similar to FIG. 2, but showing the improved chain conveyor and pallet as disclosed by the present invention.

An embodiment of a chain conveyor and pallet structure, according to the present invention, is illustrated in FIG. 3. Improved pallet 64 has planar support surface 66 and downwardly extending guide bars 68. Downwardly extending guide bars 68 may each have an upper run contact member 70 in contact with second link 42 of endless three-link chains 35 or 36 at contact point 72. It should be understood that this invention may not be limited to chain conveyors.

Lower run contact member 74 is disposed at a lowermost portion of downwardly extending guide bar 68 and contacts third link 43 at contact point 76. It is envisioned that lower run contact member 74 could contact second link 42, however this would require that the sprocket sets have only a single sprocket gear and that the innermost sprocket gears 25, 26, 32 and 33, which would normally be placed between the second and third links be removed to provide clearance for lower contact member 74. It may not be necessary for lower contact member 74 to be supported on second link 42 along a lower run since pallet 64 will not be bearing weight from parts when extending along a lower run.

Upper run frame 78 may include third link support 80 and first link support 82 that provide support to endless three-link chain 36 axially spaced on both sides of upper run contact member 70 and contact point 72. With this support, there is no resulting moment arm applied to endless three-link chain 36 and thus, binding or bending may be avoided. Lower run frame 84 may include second link support 86 which supports endless three-link chains 35 and 36 and supports the weight of pallet 64 when extending along a lower run.

A clearance distance x is illustrated between guide bar 68 and the axially innermost portion of chains 35 and 36, or upper run frame 78. A clearance 90 is formed in upper run frame 78 and provides space between lower run contact member 74 and upper run frame 78. Clearance 90, in combination with clearance x, is sufficient to allow lower run contact member 74 to pass upper run frame 78, when pivoted. When pallet 64 is extending along an upper run, it may be lifted, pivoted approximately 90 degrees and removed from chain conveyor 20.

A clearance 88 is also formed between lower run support 84 and upper run contact member 70 when pallet 64 is extending along a lower run. This clearance, in combination with clearance distance x, is adequate to allow pallet 64 to be pivoted and removed from the chain conveyor 20.

Figure 4:
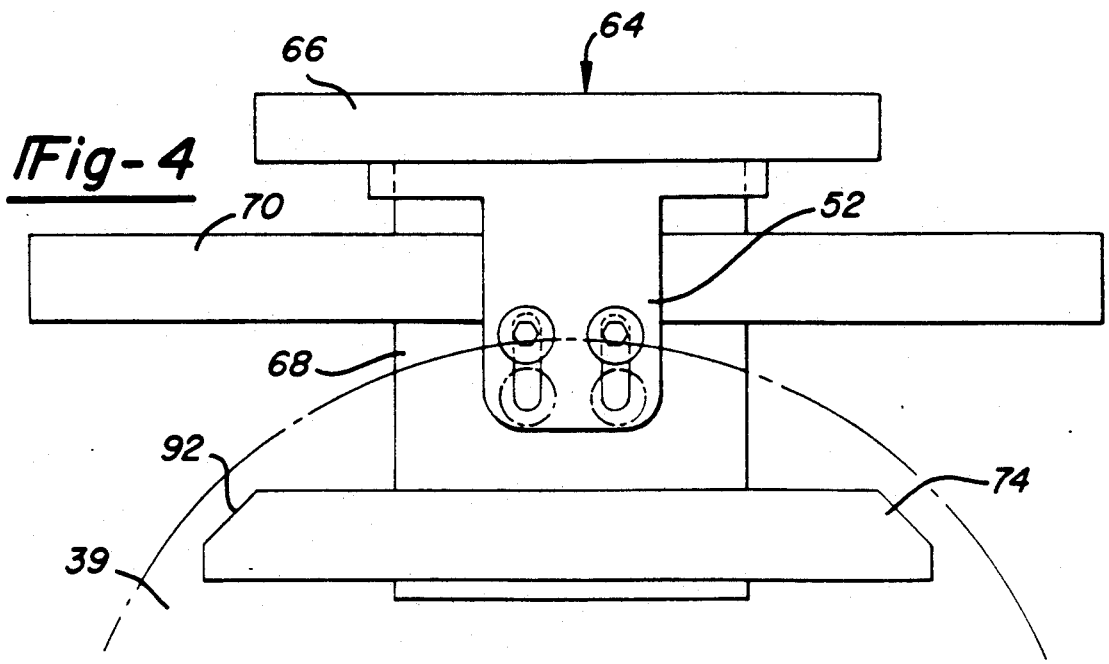
FIG. 4 is a cross-section view along lines 4—4 as shown in FIG. 3.

As shown in FIG. 4, pallet 64 has support surface 66 and downwardly extending guide bars 68 with upper run contact member 70 and lower run contact member 74. Upper run contact member 70 extends along the conveyor distance for a length greater than the length of support surface 66. Lower run contact member 74 also extends for a greater length than support service 66, although lower run contact member 74 does not extend to as great a length as upper run contact member 70. Lower run contact member 74 has chamfered ends 92 so that when pallet 64 is pivoting about the sprocket sets to move from an upper run to a lower run, chamfered ends 92 provide clearance between lower run contact member 74 and endless three-link chains 35 and 36. The relative sizes of upper run contact member 70 and lower run contact member 74 insure that pallet 64 will be firmly guided on endless three-link chains 35 and 36 as pallet 64 moves from a upper run, around the sprocket sets and downwardly to begin its lower run. In addition, the fact that both upper run contact member 70 and lower run contact member 74 extend for a greater distance than does support surface 66 serves to distribute the weight from pallet 64 to a greater surface area on endless three-link chains 35 and 36.

The length of lower run contact member is selected such that chamfered ends 92 are placed a distance from a center line of lower run contact member 74 such that they ensure proper alignment between pallet 64 and center sprocket 39 and 40. Chamfered ends 92 abut and are received between adjacent rollers of the three-link chains 35 and 36. Pallet 64 will stall while awaiting chamfered end 92 to align with a space between the rollers. By selecting the distance from chamfered end 92 to the center of lower run contact member 74, the proper alignment between center sprocket engagement member 52 and center sprockets 39 and 40 is assured.

The spring-loaded center engagement member 52 is shown extending downwardly to a position where it would contact center sprockets 39 or 40 when the pallet 64 is being moved from an upper run, around the sprockets sets, and downwardly onto a lower run.

Another important feature is that three-link chains 35 and 36 are uncovered along vertically upper portions. This allows easy access to the chains for repair and prevents debris from lodging and binding.

As disclosed above, the improved pallet 64 of the present invention may be removed from chain conveyor 20 by simply lifting and pivoting the pallet approximately 90 degrees in order to clear lower run contact member 74 from the axially innermost extents of chains 35 and 36 and upper run frame members 78. Pallet 64 may then simply be removed upwardly or outwardly. This removal could be performed by a robotic manipulator and allows a conveyor arrangement to be set up in which a first conveyor moves pallet 64 from a first position to a second position at which a manipulator removes pallet 64 from the first conveyor, turns pallet 64 and places it on a second conveyor that may move from the second position back to the first position. This eliminates the lower run. Thus, two conveyors can be supplied with pallets using only half the pallets that would otherwise be necessary.

Also, an automatic station on a single conveyor could lift pallet 64 at an intermediate position on the conveyor distance and turn it 180 degrees to reorientate the parts on pallet 64 to conform to another machine on the conveyor line.

Preferred embodiments of the present invention have been disclosed, however, a worker skilled in the art would realize that certain modifications would come within the scope of this invention, the scope of which can be understood from the following claims.

We claim:
1. A chain conveyor comprising:
  (a) a first shaft rotating about a first axis, there being at least two sprocket sets spaced axially along said first axis;
  (b) a second shaft rotating about a second axis, said second axis being parallel to said first axis and spaced from said first axis by a conveyor distance, there being at least two sprocket sets spaced axially along said second axis.
  (c) frame members mounting said first and second shafts and said sprocket sets and defining axial ends of said first and second shafts;
  (d) a pair of endless chains, each being received over one of said sprockets sets on said first axis and one of said sprocket sets on said second axis, such that said endless chains extend over one of said sprocket sets on said first axis, extend on an upper run along said conveyor distance, extend over and under one of said sprocket sets on said second axis, and extend on a lower run back along said conveyor distance;
  (e) each of said endless chains having three links, said three links being spaced inwardly from each of said axial ends towards the other of said axial ends, a first link being defined as the link closest to each of said axial ends, a second link being defined as the next innermost link and the third link being defined as the innermost link;
  (f) a pallet being mounted for movement on said endless chains, said pallet having a generally planer support surface and a pair of downwardly extending guide bars, each of said guide bars having an upper run contact member in frictional contact with said endless chains when said pallet is on an upper run and a lower run contact member in frictional contact with said endless chains when said pallet is on a lower run, said upper run contact members on each of said guide bars being spaced from each other by a distance equal to the axial distance between said second links of each of said pair of endless chains;
  (g) said generally planer support surface of said pallet extends for a first distance along said conveyor distance, said upper run contact member extends for a second distance along said conveyor distance, said second distance being greater than said first distance, said lower run contact member extending for a third distance along said conveyor distance, said third distance being greater than said first distance but less than said second distance.

2. A chain conveyor as recited in claim 1, and wherein each of said guide bars having said lower run contact member in contact with said third link when said pallet is on a lower run.

3. A chain conveyor as recited in claim 2, and wherein a pair of upper run frames support said pair of endless chains along an upper run, said pair of upper run frames having support surfaces below each of said first and third links.

4. A chain conveyor as recited in claim 3, and wherein said pallet may be removed from said chain conveyor.

5. A chain conveyor as recited in claim 4, and wherein said guide bars are axially spaced from an axially innermost portion of said endless chains and said upper run frames, and said lower run contact member is vertically spaced from said upper run frames, such that said pallet may be removed by lifting and pivoting said pallet with respect to said upper run frame.

6. A chain conveyor as recited in claim 4, and wherein a pair of lower run frames support said pair of endless chains along a lower run, said paid of lower run frames having support surfaces below said second links.

7. A chain conveyor as recited in claim 1, and wherein said lower run contact members having chamfered portions facing said upper run contact portion at ends of said lower run contact member extending along said conveyor distance.

8. A chain conveyor as recited in claim 1, and wherein a pair of upper run frames support said pair of endless chains along said upper run, said pair of upper run frames having support surfaces below each of said first and third links.

9. A pallet for use with a chain conveyor comprising:
  (a) a generally planer support surface having a width and a length;
  (b) a pair of downwardly extending guide bars extending from one of the planer faces of said generally planer support surface, each of said guide bars having an upper run contact member and a lower run contact member, said lower run contact member being spaced vertically downwardly away from said support surface to a greater extent than is said upper run contact member; and
  said upper run contact member extending for a distance longer than the length of said support surface and said lower run contact member extending for a length greater than the length of said support surface, but less than the length of said upper run contact member.

10. A pallet as recited in claim 9, and further wherein said upper run contact members of said pair of downwardly extending guide bars being separated from each other by a distance corresponding to the distance between the middle links of the two endless three-link chains in a standard chain conveyor.

11. A pallet as recited in claim 9, and further wherein said lower run contact members on each of said guide bars are separated from each other by a distance that corresponds to the distance between the innermost links on the two endless three-link chains typically employed in a chain conveyor.

12. A method of conveying parts comprising:
  (a) forming a conveyor by disposing a first rotating shaft a set conveyor distance from a second rotating shaft, disposing a pair of laterally spaced endless means for moving a pallet on each of the rotating shafts;
  (b) placing a pallet having a pair of downwardly extending guide bars, each of said guide bars having an upper run contact member in frictional contact with said endless means when said pallet is on an upper run and a lower run contact member in frictional contact with said endless means when said pallet is on a lower run, upon the means for moving a pallet and conveying the pallet along the conveyor distance, a horizontal clearance provided between said upper and lower run contact members and the means for moving a pallet, such that the pallet may be lifted and removed with respect to the conveyor; and
  (c) lifting the pallet off the means for moving the pallet, pivoting the pallet laterally with respect to the conveyor distance and removing the pallet from the conveyor.

13. A method as recited in claim 12, and wherein the means for moving a pallet is a pair of endless three-link chains.

14. A method as recited in claim 13, and wherein the pallet is supported on the middle link of each of the endless three-link chains.

15. A method as recited in claim 12, and wherein the pallet is removed at the end of the conveyor distance, and replaced on a second conveyor extending in a second direction different than the first conveyor direction.

16. A method as recited in claim 12, and wherein pallet is pivoted approximately 90°.

17. A method of conveying parts comprising:
  (a) forming a conveyor by disposing a first rotating shaft a set conveyor distance from a second rotating shaft, disposing a pair of laterally spaced endless chain means for moving a pallet on each of the rotating shafts;

(b) placing a pallet having a pair of downwardly extending guide bars, each of said guide bars having an upper run contact member in frictional contact with said endless means when said pallet is on an upper run and a lower run contact member in frictional contact with said endless means when said pallet is on a lower run, upon the means for moving a pallet and conveying the pallet along the conveyor distance, a horizontal clearance being provided between said upper and lower run contact members and the means for moving a pallet, such that the pallet may be lifted and rotated about a vertical axis with respect to the conveyor;

(c) lifting the pallet off the means for moving the pallet, turning the pallet 180° about a vertical axis, and placing the pallet back on the means for moving the pallet.

18. A method a recited in claim 17, and wherein the means for moving a pallet is a pair of endless three-link chains.

19. A method as recited in claim 18, and wherein the pallet is supported on the middle link of each of the endless three-link chains.

* * * * *